United States Patent [19]

Makuch

[11] 4,190,317
[45] Feb. 26, 1980

[54] FIBER OPTIC CABLE CONNECTOR PIN ASSEMBLY

[75] Inventor: John A. Makuch, Danbury, Conn.

[73] Assignee: Bunker Ramo Corporation, Oak Brook, Ill.

[21] Appl. No.: 866,198

[22] Filed: Dec. 30, 1977

[51] Int. Cl.$^2$ .............................................. G02B 5/14
[52] U.S. Cl. .................................................. 350/96.20
[58] Field of Search ................ 350/96.20, 96.21, 96.22

[56] References Cited

U.S. PATENT DOCUMENTS

| 624,392 | 5/1899 | Smith | 350/96.10 |
| 3,923,371 | 12/1975 | Dalgleish | 350/96.21 |
| 4,124,271 | 11/1978 | Green | 350/96.20 |

FOREIGN PATENT DOCUMENTS

| 2553877 | 6/1976 | Fed. Rep. of Germany | 350/96.21 |
| 1463350 | 2/1977 | United Kingdom | 350/96.22 |

*Primary Examiner*—Rolf G. Hille
*Attorney, Agent, or Firm*—F. M. Arbuckle; W. Lohff; P. Ertel

[57] ABSTRACT

An improved connector pin assembly and method for concentrically aligning and terminating an optical fiber of a fiber optic cable with respect to the outer dimension of the pin negates the heretofore required epoxy or other adhesive for providing secure termination of an optical fiber within a terminal pin. The assembly includes a terminal pin having a fiber optic cable receiving bore extending into the pin from its rear end and a terminal end bore of smaller dimension extending into the terminal pin from the terminal pin forward terminating end. The terminal end bore communicates with the cable receiving bore and is concentric to the outer dimension of the terminating pin terminal end. A resilient insert member having a central aperture dimensioned for receiving the optical fiber and an outer portion which is greater in dimension than the terminal end bore when the insert member is in its free uncompressed state is forced into the terminal end bore. The terminal end bore uniformly compresses the resilient insert member thereby causing the central aperture to be uniformly contracted about the optical fiber threaded through the bores and the central aperture as the insert member is forced into the terminal end bore. As a result, the optical fiber is firmly gripped and disposed within the terminating pin by the resilient insert member concentrically with respect to the outer dimension of the terminating pin terminal end.

14 Claims, 3 Drawing Figures

FIBER OPTIC CABLE CONNECTOR PIN ASSEMBLY

FIELD OF THE INVENTION

The present invention is generally directed to an improved fiber optic connector assembly and method for terminating an optical fiber within the terminal end of a fiber optic connector. The present invention is more particularly directed to an improved connector pin assembly and method for aligning and terminating an optical fiber of a fiber optic cable within a terminating pin concentrically with respect to the outer dimension of the terminating pin terminal end.

BACKGROUND OF THE INVENTION

In recent years fiber optic light transmission systems, wherein a single optically-conductive fiber or multiplicity of parallel optically-conductive fibers are arranged to form a flexible light-conductive cable bundle for conveying light from one location to another, have come into increasing use, not only for providing illumination, but also for conveying data from one location to another. In the latter application, a light source is modulated with data to be transmitted at one end of the cable bundle, and the data is recovered at the other end of the cable bundle by a photo-sensitive detector. Since the data is conveyed by a medium not subject to radio frequency interference or detection, such light transmission systems are particularly well adapted for high security applications, such as found in the data processing and military communications field.

With the increasing use of fiber optic systems, the need has developed for a connector for optically coupling segments of light-conductive cables with minimum detriment to the optical transmission path. It is generally well known that to achieve efficient light transfer between a pair of fiber optic cables, the optical fibers of the cables must be axially and angularly aligned and spaced as close together as possible without touching. Where the fiber optic cables are used for conveying data, as the data transmission frequency is increased, the diameters of the fiber optic cables must be decreased to avoid dispersion and other deleterious effects within the optical transmission path. Data transmission frequencies have increased to the point where only a single optical fiber is utilized for conveying the data. As a result, the absolute magnitude alignment tolerance of the optical fiber ends is extremely small.

It has been found that extremely strict axial and angular alignment between a pair of fiber optic cables can be achieved by terminating the optical fibers of the cables in terminating pin assemblies with the optical fibers disposed along a preselected axis within the pins. As a result, when a pair of fiber optic cable terminating pins having optical fibers therein disposed along a preselected axis are aligned, the optical fiber terminating ends will also be in close alignment. It has been found that accurate alignment of optical fiber ends may best be achieved when the optical fibers are terminated within the terminal ends of the terminating pins concentrically aligned with respect to the outer dimensions of the terminating pin terminal ends. As a result, when a pair of such terminating pins are concentrically and accurately aligned, the optical fibers will likewise be accurately aligned for efficient light transfer. Such alignment is also independent of terminal pin rotation.

Many techniques have been devised for aligning optical fibers concentrically with respect to the outer dimensions of fiber optic cable terminating pins. One such technique which has proven successful is fully disclosed and claimed in copending application Ser. No. 806,953, filed June 15, 1977 in the name of the inventor of the present invention, and which is assigned to the assignee of the present invention. The connector pin assembly disclosed in that application includes a cylindrical terminating pin having a longitudinal bore extending into the rear end of the terminating pin and a counterbore extending into the terminating pin from the terminal end of the pin. The counterbore has inner walls which are concentric with respect to the outer dimension of the cylindrical terminating pin and communicates with the longitudinal bore. A plurality of pin members of equal diameter dimension are within the counterbore and arranged in side-by-side relation for substantial tangential contact with the inner walls of the counterbore and substantial tangential contact with each other. As a result, an optical fiber threaded through the longitudinal bore, the counterbore, and the central passageway defined by the pin members is concentrically aligned within the central passageway defined by the pin members with respect to the outer dimension of the terminating pin. For securing the optical fiber within the terminating pin, epoxy or other suitable adhesive material is introduced into the terminal end of the terminating pin to bond the optical fiber within the terminating pin at the terminating pin terminal end.

Another technique which has proven successful is fully disclosed and claimed in copending application Serial No. filed on Nov. 11, 1977, U.S. Ser. No. 849,055, also in the name of the inventor of the present invention, and which is also assigned to the assignee of the present invention. The technique there disclosed locates an optical fiber along a preselected axis within the terminal end bore of an fiber optic connector, such as the central axis of the connector, and is particularly adapted for high volume manufacturing production. A jig formed from cold flowable material and having a bore dimensioned for receiving the optical fiber is aligned by an indexing means so that the jig bore is aligned with the preselected axis. A force applying means, such as a collet chuck, exerts a uniform compressive pressure on the jig for causing the cold flowable material to flow about the optical fiber and locate the optical fiber along the preselected axis. Prior to exerting the uniform compressive pressure to the jig, epoxy or other suitable adhesive material is caused to flow into the terminal end bore of the fiber optic connector and around the optical fiber within the terminal end bore. As the collet chuck exerts the uniform compressive pressure to the jig, the epoxy is cured to securely bond the optical fiber within the fiber optic connector.

While the foregoing techniques have been found to be successful for locating an optical fiber along a preselected axis within the terminal end bore of a fiber optic connector, because adhesive material, such as epoxy is required for bonding the optical fiber within the fiber optic connector or terminating pins, these techniques are only suited for application in laboratory or manufacturing environments having the necessary equipment for preparing the adhesive material and curing the adhesive material. As a result, there is a need for a fiber optic cable connector pin assembly which may be utilized for accurately aligning and terminating an optical fiber in a field environment where specialized adhesive preparing and curing equipment is not available or which may be utilized by a user which does not have the specialized adhesive preparing and curing equipment.

It is therefore a general object of the present invention to provide a new and improved connector pin assembly which aligns and terminates an optical fiber of a fiber optic cable along a preselected axis of a fiber optic cable terminating pin.

It is a further object of the present invention to provide a new and improved connector pin assembly which concentrically aligns and terminates an optical fiber of a fiber optic cable with respect to the outer dimension of the connector pin which negates the heretofore required adhesive materials for bonding the optical fiber within the connector pin.

It is a still further object of the present invention to provide a connector pin assembly which is readily adapted for field termination of an optical fiber within the fiber optic connector pin.

It is a still further object of the present invention to provide a new and improved method for aligning and terminating an optical fiber of a fiber optic cable within a fiber optic cable terminating pin and which may be practiced in a field environment where specialized adhesive preparing and curing equipment is not available.

SUMMARY OF THE INVENTION

The invention provides a fiber optic connector assembly for aligning and terminating at least one optical fiber of a fiber optic cable within the connector along a predetermined axis. The assembly includes a rigid body having a bore dimensioned for receiving the cable, a central axis in common with the predetermined axis and a compressible insert member having an outer dimension greater in dimension than the bore and a central aperture dimensioned for receiving the optical fiber, the compressible insert member being adapted for forced insertion into the bore and being substantially uniformly compressed by the bore for substantially uniformly reducing the dimension of the central aperture about the optical fiber to thereby firmly grip the optical fiber and dispose the optical fiber along the predetermined axis.

The invention also provides a connector pin assembly for concentrically aligning and terminating an optical fiber of a fiber optic cable with respect to the outer dimension of the connector pin. The assembly includes a tubular rigid body having a rear end, a forward end, a first bore extending into the rear end dimensioned for receiving the cable, and a second bore extending into the terminal forward end communicating with the first bore and being concentric to the outer dimension of the terminal end. The assembly also includes a resilient insert member having a central aperture dimensioned for receiving the optical fiber and an outer portion which is greater in dimension than the second bore when the insert member is in its free uncompressed state, and the insert member being adapted to be forced into the second bore and uniformly compressed by the second bore to uniformly contract the central aperture about an optical fiber threaded through the bores and the aperture as the insert member is forced into the second bore for firmly gripping and disposing the optical fiber within the rigid body concentrically to the outer dimension of the terminal end.

The present invention still further provides a method of aligning and terminating an optical fiber of a fiber optic cable within a fiber optic connector concentrically with respect to the outer dimension of the connector. The method comprises the steps of providing a body of rigid material having a rear end, a forward terminal end, and a bore therethrough dimensioned for receiving at least the optical fiber to be terminated, and having an inner surface concentric to the outer dimension of the terminal end, threading the optical fiber through the bore from the rear end, providing a compressible insert member having a central aperture dimensioned for receiving the optical fiber and an outer dimension portion which is greater in dimension than the bore, threading the optical fiber through the central aperture, and thereafter forcing the compressible insert member into the bore at the terminal end to cause the bore to uniformly compress the compressible insert member and uniformly contract the central aperture about the fiber to thereby firmly hold the optical fiber and dispose the optical fiber concentrically with respect to the outer dimension of the connector.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, in the several figures of which like reference numerals identify like elements, and in which:

DESCRIPTION OF THE PREFERRED EMBODIMENT

Figure 1:
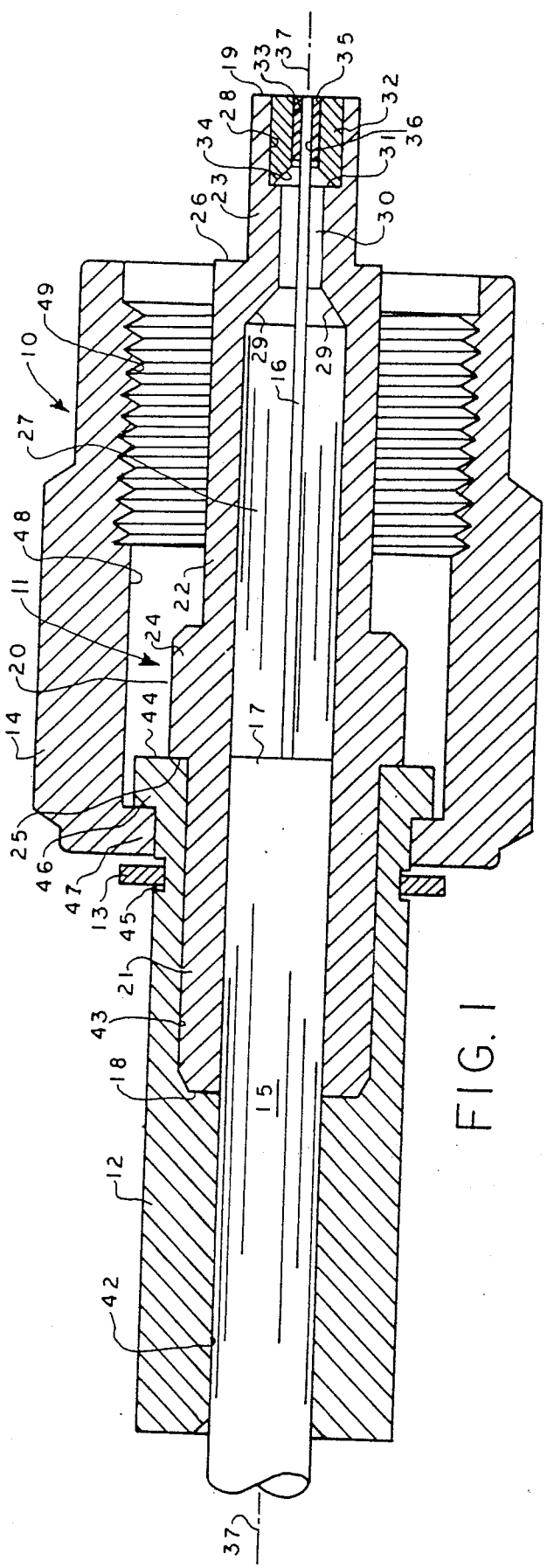
FIG. 1 is a cross-sectional view of a complete fiber optic connector which includes a connector pin assembly embodying the present invention having an optical fiber which has been aligned and terminated within a terminating pin in accordance with the present invention.

Referring now to FIG. 1, it shows a complete fiber optic connector which includes an optical fiber which has been aligned and terminated within a connector pin assembly constructed in accordance with the present invention. The fiber optic connector of FIG. 1, generally designated at 10 includes a connector pin assembly 11, a rear body portion 12, a retaining ring 13, and a coupling nut 14. The connector 10, as illustrated, terminates a fiber optic cable 15 of the type which includes a single optical fiber 16 which is contained within a coaxial protective jacket or sleeve 17.

The connector pin assembly 11 is generally cylindrical in shape and comprises a rigid stainless steel tubular body 20 having a rear end 18 and a forward or terminating end 19. The tubular body includes a major diameter portion 21, an intermediate portion 22, and a minor diameter portion 23 at the terminal end 19. Between the major diameter portion 21 and the intermediate diameter portion 22 is an annular flange 24 which has a rearwardly facing annular shoulder 25. Between the intermediate diameter portion 22 and the minor diameter portion 23 is a forwardly facing shoulder 26 defined by those two portions which adapts the connector 10 for mating interconnection with a complementary connector carrying a like terminal pin structure in a manner as described and claimed in copending patent application Ser. No. 788,820, filed Apr. 19, 1977 in the names of John A. Makuch and Henry R. Fredlund, Jr., which issued on Feb. 20, 1979 as U.S. Pat. No. 4,140,366, and which is assigned to the assignee of the present invention. The connector assembly described therein will be more fully referred to hereinafter.

The tubular body 20 also includes a longitudinal bore 27 which extends into the rear end 18 of the tubular body and which is dimensioned for receiving the fiber optic cable 15. Longitudinal bore 27 includes forwardly converging conical sidewalls 29 which define an entrance into a reduced diameter bore portion 30 of longitudinal bore 27. A counterbore 28 extends into the forward end 19 of the tubular body 20 and communicates with the longitudinal bore 27 at the reduced diameter bore portion 30. The counterbore 28 is greater in diameter dimension than the reduced diameter bore portion 30 to define a forwardly facing annular shoulder portion 31. Counterbore 28 is also so arranged within terminal end 19 of tubular body 20 so that its inner surface is concentric to the outer dimension of the minor diameter portion 23 at terminal end 19.

The connector pin assembly 11 also includes a rigid insert member 32 which is preferably formed from stainless steel with an outer diameter corresponding to the diameter of counterbore 28 so that insert member 32 is received within counterbore 28 in a tight tolerance fit. The insert member 32 includes a bore 33 which forms the terminal end bore of the connector pin assembly. It is dimensioned for receiving the optical fiber 16 and is concentric to the outer dimension or surface of insert member 32 and thus concentric with respect to the outer dimension or surface of the minor diameter portion 23 of the tubular body 20 at the terminal end 19. The terminal end bore 33 has a converging sidewall entrance 34 which includes conical sidewalls converging in the direction towards the terminating pin forward end for guiding the optical fiber 16 into the terminal end bore 33.

The connector pin assembly 11 lastly includes a resilient or compressible insert member 35 which has been forcedly inserted into terminal end bore 33. The resilient insert member 35 includes a central aperture 36 which contracts or is reduced in diameter dimension during the forced insertion of resilient insert member 35 into terminal end bore 33 to align and firmly grip the optical fiber 16 along the central axis 37 of the connector pin assembly 11.

Figure 3:
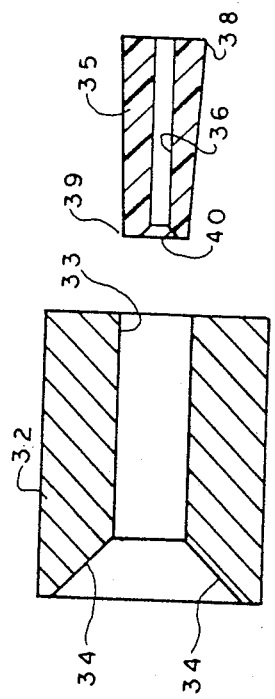
FIG. 3 is a cross-sectional view to an enlarged scale illustrating the rigid insert member and resilient compressible insert member components of a connector pin assembly embodying the present invention.

As best seen in FIG. 3, the resilient insert member 35, prior to its forced insertion into terminal end bore 33, is conical in shape having a rear end dimension 39 which is smaller in diameter dimension than the diameter of terminal end bore 33 and a forward end dimension at 38 which is greater in diameter dimension than the diameter of terminal end bore 33. Hence, at a point intermediate ends 39 and 38, the resilient insert member 35 will have an outer dimension equal to the dimension of the terminal end bore 33 and from that point forward to the forward end 38 will include an outer surface portion which is greater in dimension than the dimension of terminal end bore 33.

The central aperture 36 has a converging sidewall entrance 40 for guiding the optical fiber 16 through the central aperture 36. The central aperture 36 is also disposed within the resilient insert member 35 such that it is concentrically located within the insert member.

The inner surface of the terminal end bore 33 is cylindrical and as the resilient insert member 35 is inserted into the terminal end bore 33 the terminal end bore 33 will uniformly compress the resilient insert member 35 so that the central aperture 36 will uniformly contract about the optical fiber. Because the outer surface of the resilient insert member 35 is frusto-conical, it is adapted for gradual insertion into the terminal end bore 33 and thus the dimension of central aperture 36 will be gradually reduced as the insert member 35 is inserted into the terminal end bore 33 until it reaches its final position within the bore 33 as shown in FIG. 1.

Figure 2:
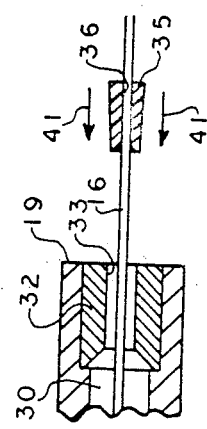
FIG. 2 is a partial cross-sectional view to an enlarged scale illustrating a method of terminating an optical fiber within the terminal end of a terminating pin in accordance with the present invention.

Referring now to FIG. 2, the method of the present invention is preferably practiced by threading the optical fiber 16 through the longitudinal bore into the reduced diameter bore portion 30 of the longitudinal bore and through the terminal end bore 33 of rigid insert member 32. The optical fiber 16 is then threaded through the central aperture 36 of resilient insert member 35. Thereafter, the resilient insert member 35 is moved relative to the terminal end 19 of the tubular body 20 in the rearward direction as indicated by arrows 41 for insertion of the resilient insert member 35 into the terminal end bore 33. As the resilient insert member 35 is inserted into the terminal end bore 33, the terminal end bore 33 will uniformly compress the insert member 35 and cause gradual reduction in the dimension of the central aperture 36. When the resilient insert member 35 is fully inserted as shown in FIG. 1, the central aperture 36 will be reduced in dimension to the point where it disposes the optical fiber 16 concentrically with respect to the outer dimension or surface of the minor diameter portion 23 of terminal end 19 and firmly grips the optical fiber within the terminal end for securely holding and terminating the optical fiber within the connector pin assembly. To complete the termination procedure, the excess optical fiber extending forwardly from the terminal end 19 is removed and the resulting end surface is ground and polished to a smooth surface.

Referring again to FIG. 1, the rear body portion 12 of connector 19 is also tubular and includes a rear bore 42 dimensioned for receiving the fiber optical cable 15, and a forward bore 43 dimensioned for tightly receiving the major diameter portion 21 of tubular body 20. The rear body portion 12 has a forward annular face 44 which abuts the rearwardly facing shoulder 25 of annular flange 24.

The rear body portion 12 also has an annular slot 45 which is dimensioned for receiving retaining ring 13 to axially fix the retaining ring therein. The retaining ring 13 and an annular flange 46 coact to confine coupling nut 14 on the forward end of the rear body portion 12. To that end, coupling nut 14 includes a reduced inner diameter portion 47 which is confined between the retaining ring 13 and the annular flange 46.

The coupling ring 14 includes a major inner diameter portion 48 which carries suitable inner threads 49 for threadingly mating the connector 10 with a complementary connector. The complementary connector may include an alignment sleeve carried by its terminating pin as fully described and claimed in the aforementioned copending application Ser. No. 788,820, now U.S. Pat. No. 4,140,366. As described and claimed in that patent, the sleeve carried by the mating terminating pin is preferably constructed from resilient material and is dimensioned for tightly receiving the terminal end 19 of the terminating pin assembly 11. The sleeve aligns and spaces the terminating end faces of the fiber optic cables for efficient light transfer. Preferably, the optical fibers are disposed within the terminal ends of their respective fiber optic cable terminating pins concentrically aligned with the outer dimension of the fiber optic cable terminating pin terminal ends. With the terminal ends accurately aligned by the sleeve, the terminal ends of the optical fibers will be known to be in accurate alignment also.

From the foregoing, it can be seen that the present invention provides a new and improved fiber optic cable connector pin assembly for aligning and terminating an optical fiber of a fiber optic cable within a terminating pin, along a predetermined axis of the connector, for example, the central axis of the terminating pin. While the invention has been described in the context of a single channel connector, it must be understood that the present invention is equally well adapted for use in multi-channel connectors as well. Because the connector pin assembly and method of the present invention negates the use of adhesive materials such as epoxy for terminating the optical fiber, the present invention affords field termination of optical fibers where prior art methods have failed. Specifically, the connector pin assembly and method of the present invention is particularly well adapted for field use where adhesive preparing and curing equipment is not available. As a result, the present invention provides a new and unique solution to the problem of field terminating an optical fiber of a fiber optic cable to a fiber optic connector.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. An assembly for aligning and terminating at least one optical fiber of a fiber optic cable along a predetermined axis comprising:
   a rigid body having a uniformly cylindrical bore dimensioned for receiving said optical fiber and having a center axis in common with said predetermined axis; and
   a compressible insert member having a greater outer dimension than the diameter of said bore and having a central aperture dimensioned for receiving said optical fiber, said compressible insert member being tapered along at least a portion of its length and being adapted for forced insertion into said bore and being substantially uniformly compressed by said bore for substantially uniformly reducing the dimension of said central aperture about said optical fiber to thereby firmly grip said optical fiber in aligned and terminated position along said predetermined axis.

2. An assembly as defined in claim 1 wherein said body includes a counterbore communicating with said bore, wherein said assembly further includes a rigid insert member adapted to tightly fit into said counterbore, and wherein said rigid insert member includes a terminal end bore.

3. An assembly as defined in claim 2 wherein said rigid insert member further includes a converging sidewall entrance into said terminal end bore for guiding said optical fiber into said terminal end bore.

4. An assembly as defined in claim 1 wherein said compressible insert member has an outer surface configured for gradual insertion into said terminal end bore and gradual compression by said terminal end bore to provide gradual reduction in the dimension of said central aperture about said optical fiber.

5. An assembly as defined in claim 4 wherein said terminal end bore includes a cylindrical inner surface and wherein said compressible insert member includes an outer surface tapered along its entire length.

6. An assembly as defined in claim 5 wherein said compressible insert member has a rear end and a forward end, wherein said compressible insert member is adapted for forced insertion into said terminal end bore rear end first, and wherein said rear end is smaller in dimension than said terminal end bore and said forward end is greater in dimension than said terminal end bore.

7. A connector pin assembly for concentrically aligning and terminating an optical fiber of a fiber optic cable with respect to the outer surface of said pin comprising:
   a tubular rigid body having a rear end and a forward terminal end, said body including a first bore extending into said rear end dimensioned for receiving said cable and a second bore defined by a uniformly cylindrical inner surface extending into said forward terminal end communicating with said first bore, said second bore being concentric with the outer surface of said forward terminal end; and
   a resilient insert member having a central aperture dimensioned for receiving said optical fiber, said resilient insert member having a portion which is greater in dimension than the diameter of said second bore when said insert member is in its free uncompressed state, said insert member being tapered along at least a portion of its length and being adapted for forced insertion into said second bore, said insert member being uniformly compressed by said inner surface defining said second bore to uniformly contract said central aperture about said optical fiber as said insert member is forced into said second bore for firmly gripping and disposing said optical fiber within said rigid body concentric with the outer surface of said forward terminal end.

8. An assembly as defined in claim 7 wherein said resilient insert member includes an outer surface tapered along its entire length, wherein the rear end of said insert member is smaller in dimension than the diameter of said second bore and wherein said forward end of said insert member is greater in dimension than the diameter of said second bore.

9. An assembly as defined in claim 7 wherein said tubular body further comprises a counterbore extending into said forward terminal end being defined by an inner surface concentric with the outer surface of said forward terminal end and wherein said assembly further includes a rigid insert member adapted to tightly fit within said counterbore and including said second bore for receiving and compressing said resilient insert member.

10. An assembly as defined in claim 9 wherein said rigid insert member further includes a converging sidewall entrance into the rear end of said second bore for guiding said optical fiber into said second bore.

11. An assembly as defined in claim 10 wherein said outer surface of said resilient insert member is frustoconical.

12. A connector pin assembly for concentrically aligning and terminating an optical fiber of a fiber optic cable with respect to the outer dimension of said pin comprising:
- a tubular rigid body having a rear end and a forward terminal end, a longitudinal bore extending into said rear end and a counterbore extending into said forward terminal end and communicating with said longitudinal bore, said counterbore also being concentric with the outer surface of said forward terminal end;
- a rigid insert member having an outer surface dimensioned for tightly fitting into said counterbore and a second bore defined by a uniformly cylindrical inner surface concentric with said outer surface of said rigid insert member; and
- a resilient insert member having a central aperture dimensioned for receiving said optical fiber and an outer surface tapered along at least a portion of its length, said outer surface of said resilient insert member including a portion having a greater dimension than the diameter of said second bore to adapt said resilient insert member for gradual forced insertion into said second bore and gradual uniform compression of said resilient insert member by said second bore to thereby cause said central aperture to uniformly contract about said optical fiber to firmly grip and dispose said optical fiber concentric with respect to the outer surface of said forward terminal end as said resilient insert member is forced into said second bore.

13. An assembly for aligning and terminating at least one optical fiber of a fiber optic cable along a predetermined axis comprising:
- a body having a uniformly cylindrical bore for receiving an optical fiber of said cable and having a center axis in common with said predetermined axis;
- a compressible insert member having a central aperture dimensioned for receiving said optical fiber, said compressible insert member being tapered along at least a portion of its length; and
- means for compressing said insert member upon insertion of said insert member into said bore for reducing said central aperture about said optical fiber for confining said optical fiber along said predetermined axis.

14. A connector assembly as defined in claim 13 wherein said body includes a terminal end and said means for compressing said insert member is located at said terminal end.

* * * * *